Figure 3:
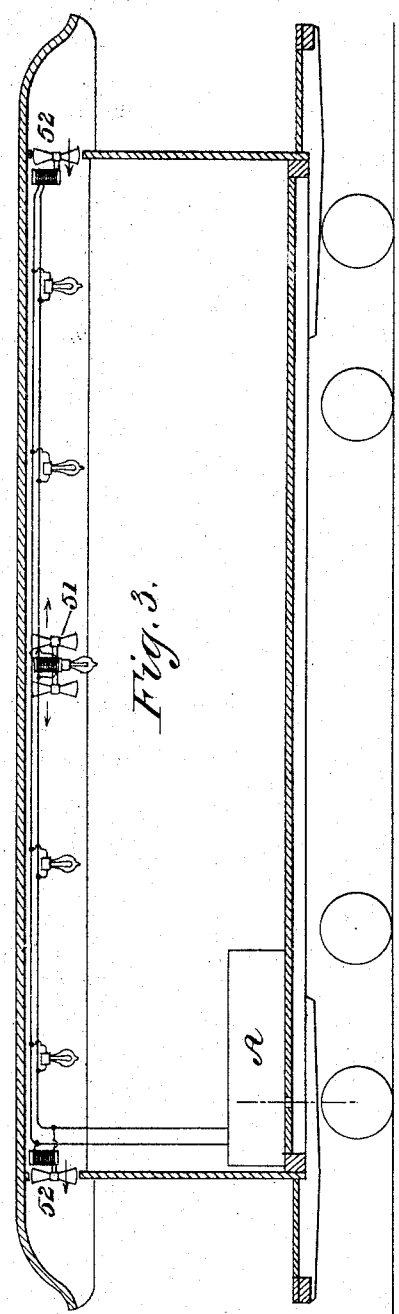

(No Model.)  2 Sheets—Sheet 1.
I. N. LEWIS.
ELECTRIC CAR LIGHTING SYSTEM.

No. 504,681. Patented Sept. 5, 1893.

WITNESSES:
Edward W Clark
A. M. Clark.

INVENTOR
Isaac N. Lewis.
BY
Henry F. Parker.
ATTORNEY (No Model.) 2 Sheets—Sheet 2.
I. N. LEWIS.
ELECTRIC CAR LIGHTING SYSTEM.
No. 504,681. Patented Sept. 5, 1893.
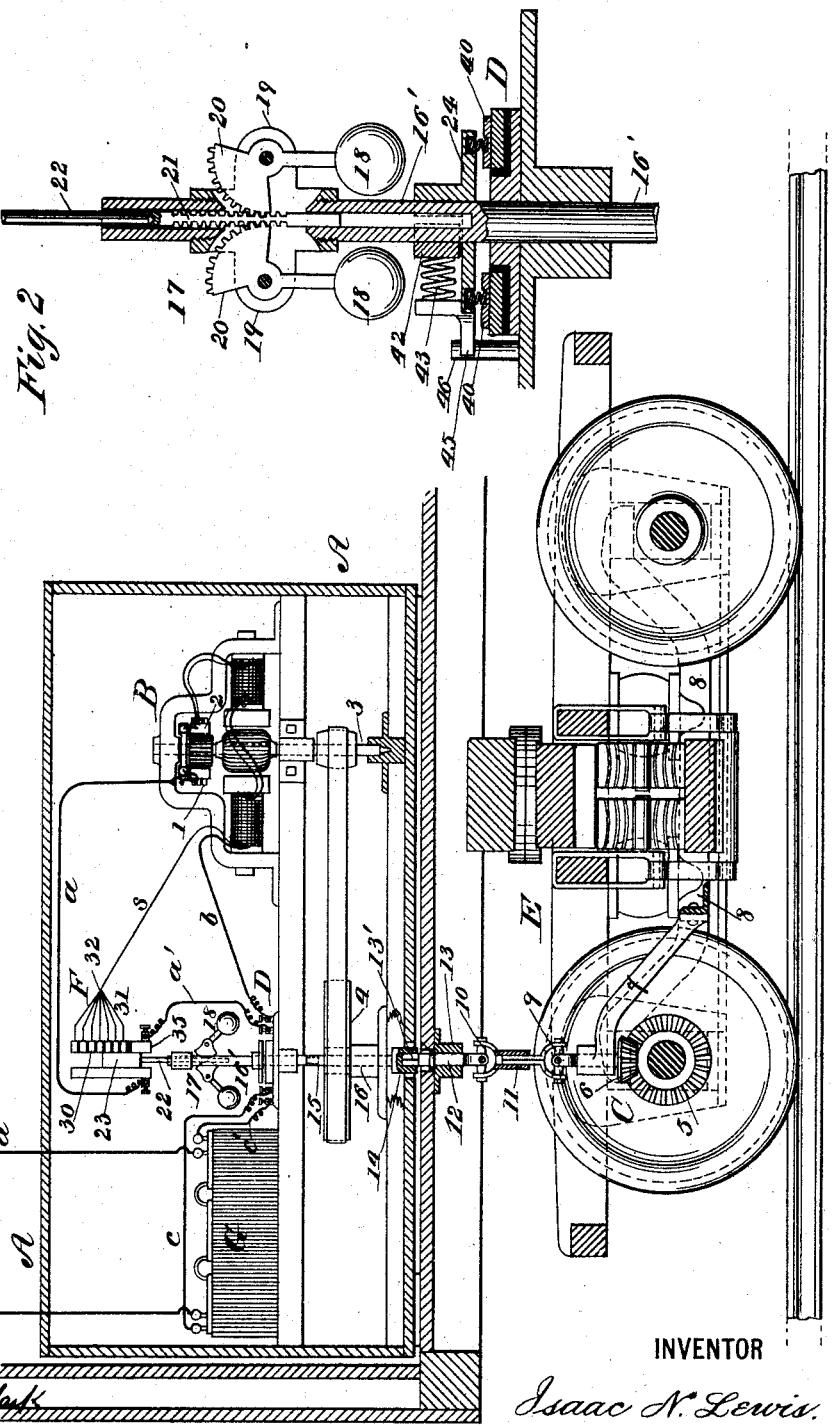
WITNESSES:
Edward W. Clark
A. M. Clark
INVENTOR
Isaac N. Lewis.
BY
Henry T. Parker.
ATTORNEY

UNITED STATES PATENT OFFICE.

ISAAC N. LEWIS, OF FORT WADSWORTH, NEW YORK.

ELECTRIC CAR-LIGHTING SYSTEM.

SPECIFICATION forming part of Letters Patent No. 504,681, dated September 5, 1893.

Application filed September 17, 1892. Serial No. 446,224. (No model.)

*To all whom it may concern:*

Be it known that I, ISAAC N. LEWIS, a citizen of the United States, residing at Fort Wadsworth, county of Richmond, State of New York, have invented certain new and useful Improvements in the Application of Electricity for Lighting and Ventilating Railway-Cars and other Purposes, of which the following is a specification.

My invention is applicable to various fields of usefulness, and especially so to the supply of electricity to railway cars for lighting, ventilating and other purposes, from the variable source of motion derived by mechanical connection of a dynamo with the car axle.

The object of my invention in such application is to provide for the generation of a practically uniform working current from the variable electric energy generated by the motion of the car, and also to render the simultaneous use of a dynamo, a storage battery, and a lighting or power circuit connected with the car axle, practical and effective.

I provide a dynamo electric machine adapted to generate an electric current by the rotation of its shaft in either direction, and a mechanical means of connecting the same to the car axle; the said connection being unaffected by either the swivel or vertical motions of the truck. I also employ a storage battery, and provide means for reversing the circuit connection of the charging current automatically whenever the motion of the rotating dynamo shaft is reversed; thereby securing a constant direction of the charging current through the battery. Further, I employ a centrifugally actuated switch interposed in the charging circuit from the dynamo, controlled by the speed of the latter so as to break circuit when such speed falls below a certain minimum; thus when the electromotive force of the charging current is not sufficient to overcome the counter-electromotive force of the battery the circuit is broken automatically, and no reversal of the current through the dynamo from this cause is possible, but the working current from the battery continues uniform when the train runs slowly or stops. I further establish a means of preventing injury to the dynamo at unusually high speeds, by the employment of a shunt circuit and interposed resistances therein controlled by such speeds.

In order to enable others skilled in the art to which my invention appertains to understand and use the same, I will proceed to describe the details of its construction, explain its operation, and subsequently point out in the appended claims its novel characteristics.

Referring to the accompanying drawings, in which similar letters and figures of reference indicate corresponding parts throughout the several views: Figure 1, is a sectional elevation showing a portion of a railway car and my improved apparatus in connection therewith; Fig. 2, an enlarged sectional detail view of the centrifugal switch and resistance governing device, together with the reversing switch; Fig. 3, a sectional elevation of a railway car illustrating the application of my invention for illuminating and ventilating purposes; and Fig. 4, a diagram illustrating the electrical connections, including a plan view of the reversing switch shown in Fig. 2.

Within the box A, situated in or attached to any convenient part of the car, I provide a dynamo B, having commutator brushes 1, 2, (Fig. 4,) adapted to permit rotation of the shaft 3, in either direction without changing their position. The dynamo B, is preferably "compound wound," but it may be a simple "series wound" machine. It is connected to the storage battery G, by means of its charging circuit conductors $a$, $a'$, $b$, $c$, $c'$.

$s$, $a$, is the shunt circuit containing the field magnets.

As shown in the drawings, the dynamo machine B, has its armature shaft 3, mounted so as to revolve upon a vertical axis, and its driving pulley is belted to the horizontal driving pulley 4, the shaft of which is flexibly connected to gearing C, upon the car axle; but the dynamo may be mounted in any convenient manner and the counter-shaft carrying the driving pulley 4, may be arranged to lie in a horizontal or inclined position if desired. The gearing C, consists of a beveled spur wheel 5, on the car axle, and beveled pinion 6, which is mounted in a bracket 7, connected to the equalizing bars 8, of the truck frame that move in unison with the car axle.

9, and 10, represent universal joints, and 11, a telescoping sleeve of which the two parts are longitudinally movable but rotatively connected. The shaft 12, supported in bearing 13, is thereby revolved without vertical motion, and is unaffected by any swivel or vertical motions of the truck E. The upper end of the shaft 12, presents a squared head 13′, entering the socket 14, of the shaft 15, journaled at 16, bearing the said driving pulley 4. The further section 16′, is added to the shaft 15, rotating therewith, bearing the centrifugal switch regulator 17, more fully illustrated in Fig. 2, and also bearing the reversing switch D, to which the circuit wires are suitably connected in the manner clearly demonstrated in Fig. 4.

The centrifugal balls 18, are mounted upon the projections 19, of the shaft 16′, carrying toothed segments 20, which engage with the toothed rack or slide 21, within the shaft 16′, upon which toothed slide a non-rotary spindle 22, is stepped, as seen in Fig. 2. The spindle 22, carries the switch block 23, controlling the cut-out, and the resistance coils of the dynamo. The shaft 16′, also carries the rotary disk 24, of the reversing switch D, which is frictionally connected thereto, and has means for limiting its rotation to a quarter turn, so that its position is determined by the direction of motion of said shaft 16′.

Figure 4:
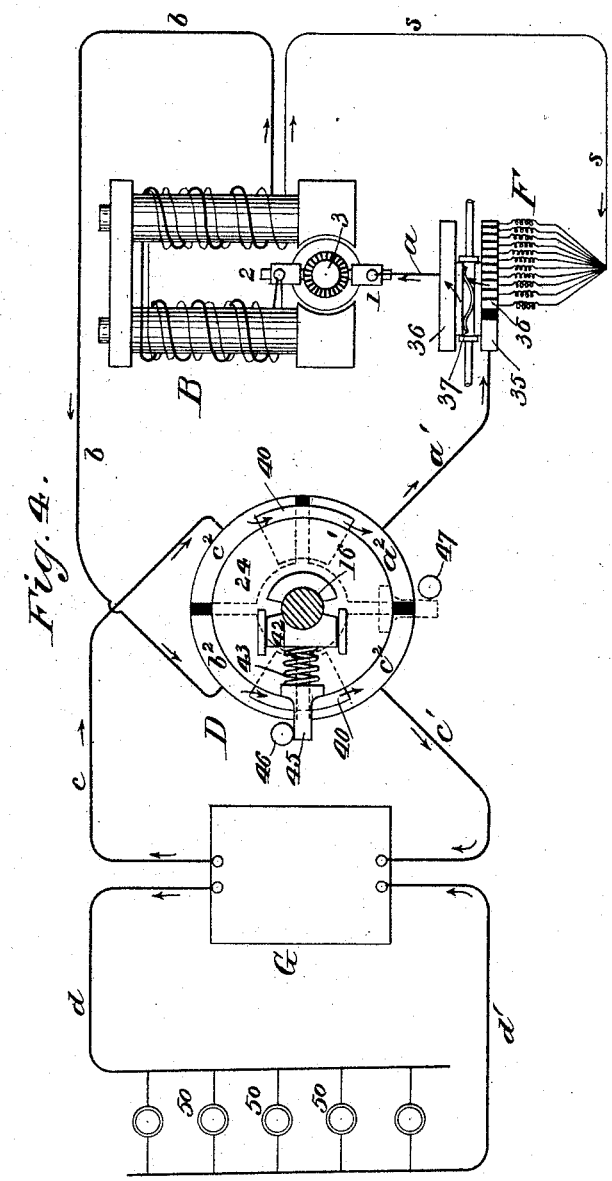

The resistance device F, is composed of a series of contact plates 30, and resistance coils 31, dividing at the common point 32, each forming a branch of the shunt circuit $s$, of the dynamo, as seen in Fig. 1, and diagrammatically in Fig. 4. By the arrangement of centrifugal balls 18, and segments 20, in connection with the spindle 22, it will be seen that when the speed increases, the switch block 23, descends, decreasing the number of branch coils 31, included, inversely increasing the resistance; and when the speed decreases, the block 23, rises, increasing the number of branch coils 31, included, inversely decreasing the resistance. When the switch block 23, has risen above the contact piece 35, the main circuit $a$, $a'$, $b$, of the dynamo will be broken. This event occurs at a certain minimum speed of the dynamo, which may be determined by the adjustment of the block 23, on the spindle 22. The contact slide 23, may, if desired, be composed of two separate pieces expanded into contact with the guides 36, and 30, 35, by means of an interposed spring 37, as illustrated in Fig. 4.

In the reversing switch D, the main circuit wires $a'$, and $b$, are connected to diametrically opposite contact sectors $a^2$, $b^2$, (Fig. 4,) and the charging wires $c$, $c'$, of the storage battery G, are connected to the alternate diametrically opposite contact sectors $c^2$, $c^2$, of said switch. The movable electrical connecting pieces 40, of the switch D, are mounted beneath the partially rotary disk 24, frictionally connected to shaft 16′, by means of block 42, compressed on said shaft by spring 43, and the rotation of such disk is limited by the abutment of its projecting stop 45, upon stationary pins 46, 47. According to the direction of revolution of the shaft 16′, the projection 45, is thrown against stop pin 46, or 47, accordingly determining the connection of the wires $b$, to $c'$, and $a'$, to $c$, in the one instance, or the connection of the wires $b$, to $c$, and $a'$, to $c'$, in the other instance. Thus, the current in $c$, $c'$, through storage battery G, is maintained in a constant direction, irrespective of the direction of charging current generated by the dynamo, the shaft of which is reversible to accommodate itself to the direction of travel of the car. The lighting and power circuit $d$, $d'$, independently connected to the storage battery G, is discharged in a parallel direction to the charging current from $c$, $c'$, and includes the lamps 50, in multiple arc, and may be also utilized to include the motive magnets of ventilating fans 51, 52, situated at certain portions of the car.

A double fan 51, is illustrated in the central part of the car in Fig. 3, adapted to deliver the current of air in opposite directions to promote circulation, while fans 52, 52, are situated in openings in the walls of the car at any suitable part, for induction or eduction of air.

The operation of the apparatus is as follows: The dynamo B, is driven in the one direction or the other, according to the direction of travel of the car, generating a current, which through the automatically reversible switch D, is caused to flow through the battery G, always in one direction; the electromotive force of such current being variable according to the speed. A continuous and practically uniform current is discharged through circuit $d$, $d'$, actuating the lamps and fans, which continue their operation whether the train is moving or standing. When the speed of the train and the dynamo becomes so low as to render the electro-motive force of the current in circuit $a$, $a'$, $b$, $c$, $c'$, less than the counter electro-motive force of the battery G, the balls 18, owing to their depression, will have moved the slide 23, upward out of contact with the piece 35, cutting out conductors $a$, $a'$, $b$, $c$, $c'$, from circuit automatically, preventing reversal of current through the dynamo. As soon as the required speed is attained, the said conductors are again automatically connected, re-establishing the charging current. When the speed becomes excessive, the balls 18, rise, and the slide 23, descends, increasing the resistance in shunt circuit $s$, thus decreasing the strength of the magnetic field and maintaining the electro-motive force of the dynamo current practically constant so long as the speed of rotation is above the minimum at which the current is automatically established.

My herein described invention may be applied also to other sources of variable speed than that shown, as in the instance of windmills or other mechanisms actuated by variable natural or other forces.

The apparatus included in the box A, is rendered portable, occupying a small space in the car. When repairs are required, the box A, may be removed from the car, and another one substituted; the coupling 13, 14, in the floor being readily separated.

The details of construction herein illustrated may be obviously modified in various ways without departing from the spirit of my invention and the same is not therefore to be construed as limited to the species of embodiment shown; for instance, in connection with the novel features of the electrical apparatus, any suitable mechanical device other than that shown and claimed may be used to impart motion from the car axle to the dynamo; and in the electrical apparatus the centrifugal governing device for the cut-out switch and resistance coils need not be confined to the construction shown; the resistance coils may be substituted by any suitable or well known arrangement of coils; and the reversing switch may be variously modified.

I do not claim in the present application the combination in a railway car carried by a swiveling truck, of a dynamo, power driven from the axle of said truck, a power transmitting shaft geared to said axle, and a bearing for said shaft carried by an arm or bracket mounted on the equalizing bar of the truck, as this combination is claimed specifically in another application for patent filed by me as a division of the present application on the 15th day of July, 1893, Serial No. 480,578. Nor do I claim herein the combination with suitable transmitting gear mounted on the car truck in immovable relation to the car axle of the universal or flexible connecting shaft capable of longitudinal extension and contraction connecting the mechanism on the truck with a vertical shaft on the car body, and a speed multiplying gear on the car between said vertical shaft and the dynamo shaft, as this combination is also claimed in the said application, filed by me July 15, 1893.

Having thus fully described my invention, what I claim, and desire to secure by Letters Patent, is—

1. In a system for producing a continuous working current of electricity from an intermittent source of motion, the combination of a dynamo, having its field circuit connected in series with its armature circuit, a storage battery, a charging circuit, a discharging circuit, and a centrifugally controlled cut-out switch interposed in the charging circuit, connected with the variable speed source from which the dynamo is driven, substantially as described.

2. In an electric lighting system, the combination of a car or other vehicle, a dynamo B, having its field circuit in series with its armature circuit, flexible connections between the dynamo and car axle, a storage battery charged by said dynamo, an automatic cut out switch, and the centrifugally controlled variable resistance device F, interposed in part of the field circuit of the dynamo, constructed and operating substantially as described.

3. In a system designed to produce a continuous current of electricity from an intermittent and reversible source of motion, the combination of a dynamo having zero lead of the commutator brushes, a storage battery charged by said dynamo, and an automatic mechanically controlled reversing switch interposed between the dynamo and the battery, the position of which is changed with every change in direction of rotation of the dynamo armature shaft, and by means of which the electric current from the dynamo is made to pass always in the same direction through the storage battery.

4. The combination in a railway car, of a dynamo, a counter shaft mechanically connected with the axle of the car truck, means for imparting rotation from the counter shaft to the rotary part of the dynamo, a storage battery upon the car, a charging circuit, a discharging circuit, a centrifugal governor upon the said counter shaft having its revolution speed less than that of the dynamo, a cut-out switch interposed in the charging circuit operatively connected to said governor, a variable resistance device interposed in the main circuit of the dynamo or in a shunt circuit thereof, and also upon said counter shaft an automatic reversing switch interposed in said charging circuit operated by frictional connection with said counter shaft; all co-operating as herein described.

ISAAC N. LEWIS.

Witnesses:
H. F. PARKER,
J. HERBERT EMORY.